United States Patent [19]

Öbel et al.

[11] Patent Number: 4,709,941

[45] Date of Patent: Dec. 1, 1987

[54] TELESCOPIC ADJUSTING CRANK FOR TRACTOR 3-POINT HITCH

[75] Inventors: Werner Öbel, Ludwigshafen; Klaus Zahn, Ostringen, both of Fed. Rep. of Germany

[73] Assignee: Deere & Company, Moline, Ill.

[21] Appl. No.: 870,194

[22] Filed: Jun. 3, 1986

[30] Foreign Application Priority Data

Jun. 4, 1985 [DE] Fed. Rep. of Germany ....... 3519987

[51] Int. Cl.⁴ .......................................... A01B 63/118
[52] U.S. Cl. ............................. 280/461 A; 280/460 A
[58] Field of Search .......... 280/491 A, 461 A, 460 A, 280/456 A; 403/109, 377

[56] References Cited

U.S. PATENT DOCUMENTS

| | | | |
|---|---|---|---|
| 3,238,809 | 3/1966 | Beard | 280/460 A |
| 3,371,945 | 3/1968 | Adams et al. | 280/461 A |
| 3,515,412 | 6/1970 | Monck et al. | 280/461 A |

FOREIGN PATENT DOCUMENTS 2656337  6/1978  Fed. Rep. of Germany .

OTHER PUBLICATIONS

Brochure for Steyr 8120 Tractor, #153/12/83.

*Primary Examiner*—John J. Love
*Assistant Examiner*—Donn McGiehan

[57] ABSTRACT

The telescopic adjusting crank for adjusting a lift link of a tractor 3-point hitch consists of an upper outer tube, an inner shaft and a slide tube wherein the slide tube is fixedly connected to the upper end of the inner shaft and is slidably positioned within the upper outer tube. The slide tube is of a greater dimension than the shaft so that a gap remains between the outer tube and the inner shaft. The outer tube and the sliding tube are of such lengths that the sliding tube remains completely within the outer tube through the full range of movement.

3 Claims, 3 Drawing Figures

TELESCOPIC ADJUSTING CRANK FOR TRACTOR 3-POINT HITCH

BACKGROUND OF THE INVENTION

The present invention relates to a telescopic adjusting crank for adjusting the lift link on a tractor 3-point hitch.

The typical tractor 3-point hitch includes a pair of upper lift arms which are pivoted by a hydraulic cylinder, a pair of lower draft links, and a pair of lift links interconnecting the lift arms and draft links. Typically, one of the lift links is made of adjustable length so as to accommodate leveling of an implement attached to the tractor. The adjustable length lift link will typically include a threaded rod portion and a threaded tubular portion with one of the portions being rotatable through a crank and transmission mechanism so that upon rotation the threads cause the link to vary in length. If the tractor is provided with an operator's cabin, or on large tractors, the spacing between the driver's seat and the adjusting crank is too great for the operator to reach the crank while safely seated in the operator's seat. In these cases it has been known to provide an extension for the crank so that the crank can be positioned closer to the operator. Because of the vertical distance through which the hitch can move, it has also been known to make the crank telescopic so that the upper part of the crank can be in a fixed axial position relative to the operator.

In the known telescopic adjusting cranks for tractor 3-point hitches, the shaft section has been made of hexagonal shape and was formed of a high grade steel. The upper tubular portion of the crank had an interior shape to slidably receive the hexagonal shaft. This structure had the disadvantage of being relatively expensive to manufacture due to the interior shape of the tubular portion. Another disadvantage with this structure was that, when in the extended condition, the hexagonal rod was exposed to the elements and would get dirty and corrode so that when the shaft was moved into the tube it caused erosion of the metal until finally the fit between the parts would no longer transfer the rotation from the tube to the shaft.

SUMMARY OF THE INVENTION

The object of the present invention is to provide a telescopic adjusting crank for the lift link on a tractor 3-point hitch which is economical to manufacture.

Another object of the present invention is to provide a telescopic adjusting crank for a lift link on a tractor 3-point hitch in which the parts having sliding contact are never out of contact with each other and hence not exposed to the elements.

According to the present invention, the objects are achieved by providing a shaft which has portions of larger and smaller cross-section with the portion of larger cross-section slidable within a tube. In the preferred embodiment of the invention the upper tube has a rectangular shape and is of a standard size. The shaft portion is made of two pieces, a standard size shaft and a standard size rectangular tube. An end portion of the shaft is welded within the tube and the tube is slidably mounted within the upper tube.

The invention will become apparent to those skilled in the art from the reading of the following detailed description when taken in conjunction with the accompaning drawings.

DESCRIPTION OF THE PREFERRED EMBODIMENT

Figure 1:
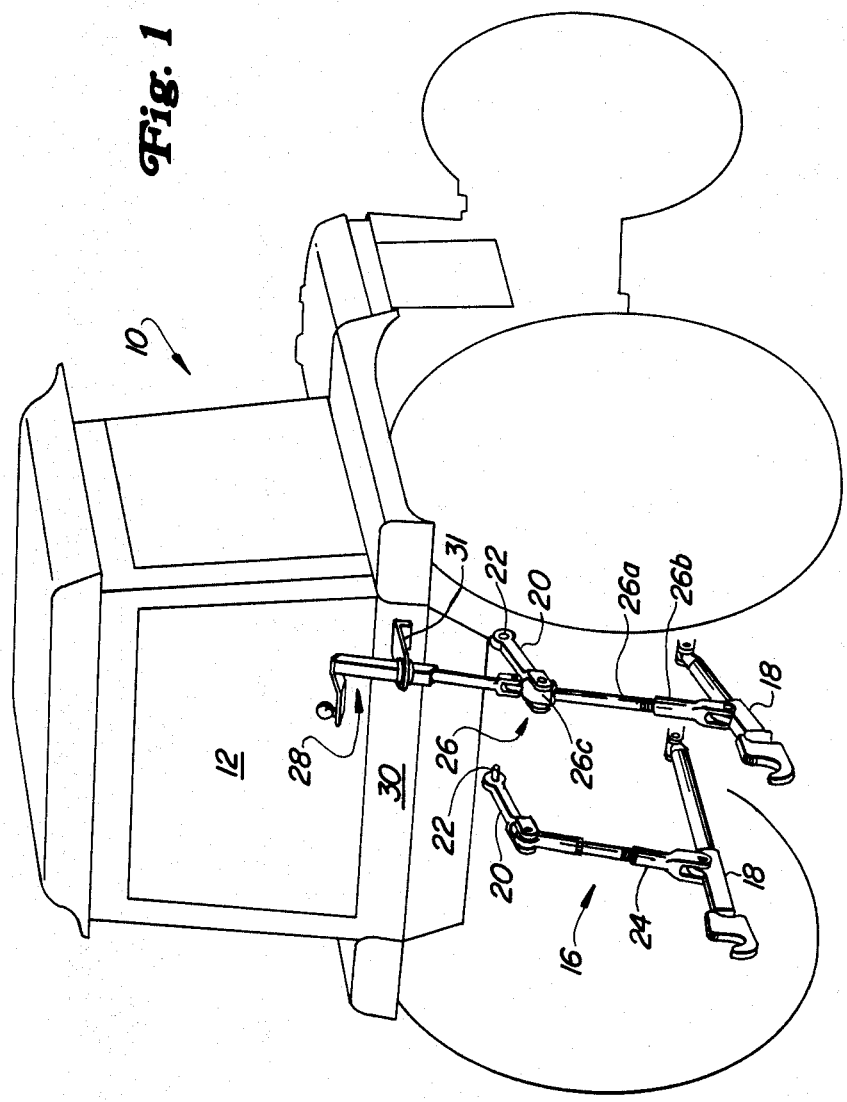
FIG. 1 is a right, rear perspective view of an agricultural tractor having a 3-point hitch.

Referring to FIG. 1, a tractor indicated generally by the reference number 10 is shown in outline form and includes an operator's cabin 12 and a 3-point hitch indicated generally at 16. The 3-point hitch includes a pair of lower draft links 18, a pair of lift arms 20 non-rotatably mounted on a rockshaft 22, a left-hand lift link 24 of fixed length, a right-hand lift link 26 of variable length, and a telescopic adjusting crank 28. The rock shaft 22 projects from the opposite sides of a power lift housing (not shown) and is rotatable by means of a hydraulic cylinder which is disposed within the power lift housing. The adjustable length lift link 26 is of conventional construction and includes a threaded shaft portion 26a an threaded tube section 26b and a transmission mechanism 26c which is operative by the adjusting crank 28. The upper portion of the adjusting crank is mounted on the rear wall 30 of the operator's station 12 by means of a swivel bearing 31. The swivel bearing 31 axially fixes the upper portion of the adjusting crank permitting rotation and pivotal movement thereof. The swivel bearing can be constructed such as the swivel bearing shown in U.S. Pat. No. 3,515,412 which issued on June 2, 1970, to Muncke et al.

Figure 2:
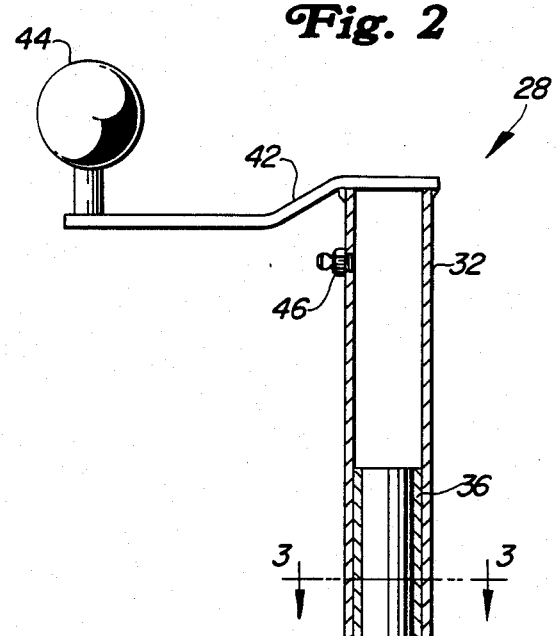
FIG. 2 is an elevational view, partially in section, of a telescopic adjusting crank according to the present invention.
Figure 3:
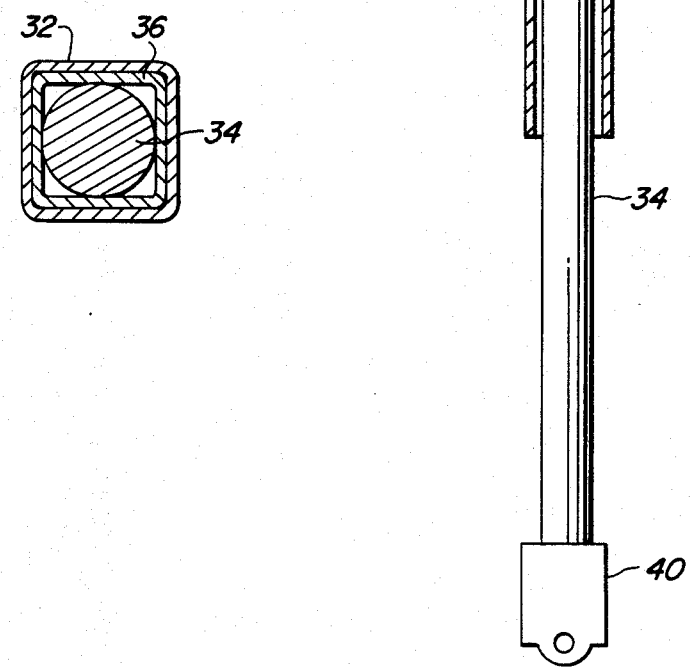
FIG. 3 is a sectional view taken along the lines 3—3 of FIG. 2.

The structure of the telescopic adjusting crank according to the present invention is best illustrated in FIG. 2 and comprises an outer tube 32 which, as shown in FIG. 3, is of rectangular construction, and an inner shaft 34 which slides within the outer tube. The end of the inner shaft, which slides within the upper tube, has an enlarged cross-section relative to the remainder of the shaft. This area of enlarged cross-section is formed by welding the end inside a short length of rectangular tubing 36 which is of a size to slidingly fit within the outer tube 32, as illustrated in FIG. 3. Tube 36 is of a length to prevent binding between the two tubes as they slide relative to one another but is short enough so that it remains within the tube 32 throughout the entire telescopic movement between the parts. Because the shaft 34 is smaller than the tube 36, that portion of the shaft 34 which may be exposed to the elements does not contact the inside of the tube 32. At its lower end, the shaft 34 is provided with a cardan joint member 40 which is adapted to be connected with a cooperative cardan joint member (not shown) at the input side of the transmission means 26a.

At its upper end, the outer tube 32 is provided with a flat crank lever 42 having a ball grip 44. The lever 42 is welded with its flat side onto the upper end of the tube 32 and thus closes off the end of the upper tube from the elements. Somewhat below the lever 42, but at a level which still aligns with the inside surface of tube 32 along which the tube 36 slides, a lubricating nipple 46 is mounted on the tube 32 so that the telescopic crank may be lubricated in the area of sliding contact. The tubes 32 and 36, as well as the shaft 34, may be made of standard stock and thus the cost of the adjusting crank is kept at a minimum. Due to the rectangular shape of the tubes 32 and 36, a good engagement is provided between the two tubes to transfer the rotation of the tube 32 to the tube 36 and hence the shaft 34.

Having thus described a preferred embodiment of the invention, various modifications within the spirit and scope of the invention will become apparent to those skilled in the art and can be made without departing from the underlying principles of the invention. Therefore, the invention should not be limited to the specific illustrated and described preferred embodiment, but only by the scope of the following claims.

We claim:

1. In a tractor having an operator's station and a 3-point hitch including draft links, lift arms, and lift links interconnecting the draft links and the lift arms, one of the lift links being adjustable in length by rotation of a part thereof, a variable length crank for the rotatable part of the adjustable lift link comprising: an upper tubular member having a non-circular interior, said upper member be mounted on the tractor for rotation in a position convenient to the operator station, a lower shaft having a lower end operatively connected to the rotatable part of the adjustable lift link, an upper portion of the shaft having an enlarged cross-section relative to the cross-section of the remainder of the shaft, said upper portion having an outer surface configuration complimentary to the interior of the upper member and be slidably engaged in the upper member.

2. A variable length crank as set forth in claim 1 wherein the length of the upper tubular member is sufficient to completely cover the upper portion of the shaft throughout the entire range of movement of the 3-point hitch.

3. A variable length link as set forth in claim 2 wherein said upper tubular member is of rectangular cross-section, a crank handle is secured to and closes the upper end of the tubular member, and the enlarged cross-section portion of the shaft is formed by a tubular member positioned over and fixed to the upper end of the shaft.

* * * * *